UNITED STATES PATENT OFFICE.

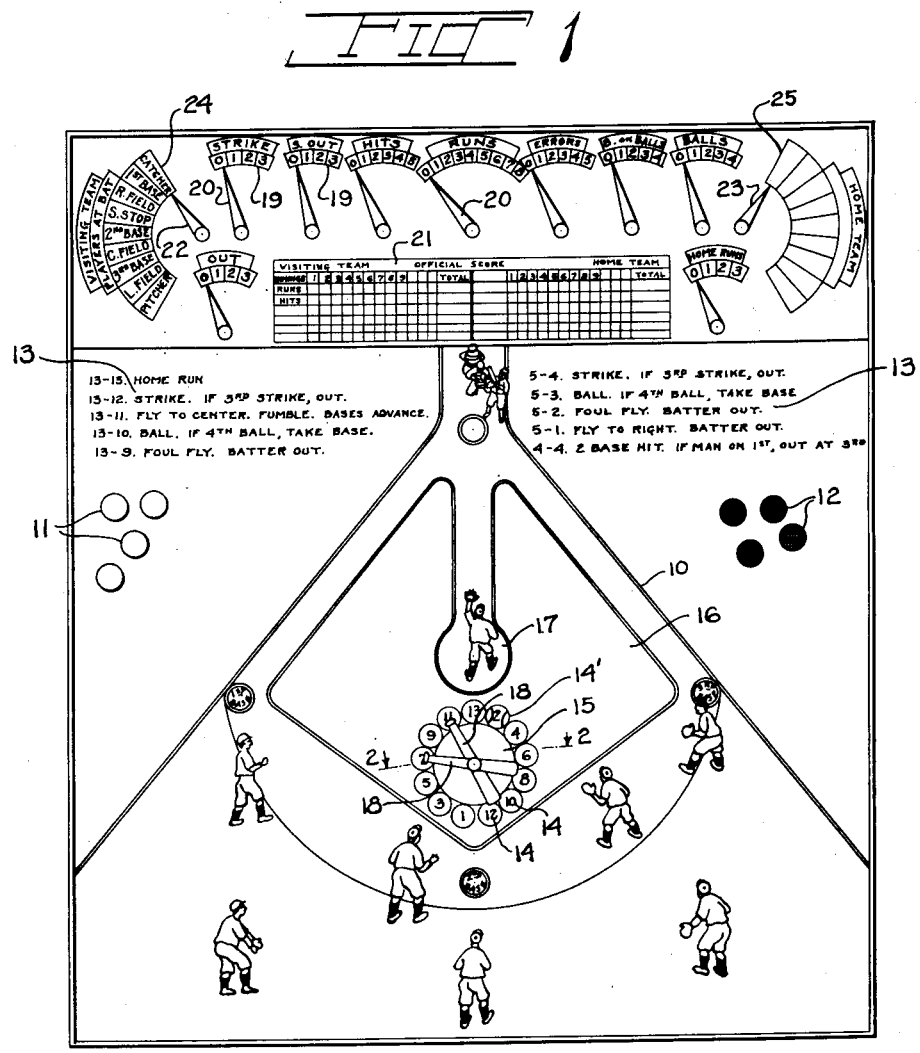

WILLIAM H. REEVES, OF ROSELLE, NEW JERSEY.

BASEBALL-GAME APPARATUS.

1,361,616.　　　　Specification of Letters Patent.　　Patented Dec. 7, 1920.

Application filed June 9, 1920. Serial No. 387,606.

*To all whom it may concern:*

Be it known that I, WILLIAM H. REEVES, a citizen of the United States, and a resident of Roselle, county of Union, and State of New Jersey, have invented certain new and useful Improvements in Baseball-Game Apparatus, of which the following is a specification.

My invention relates to a base ball game apparatus and has for its object to provide a device by means of which a game can be played, closely simulating an actual game of professional base ball. A further object of the invention is the provision of simple means for selecting individual plays from a large number of different plays.

The accompanying drawings illustrate an embodiment of my invention. Figure 1 of said drawings is a plan view showing the device, as a whole, and Fig. 2 is a cross sectional view, taken on the line 2—2, Fig. 1.

In accordance with my invention, a base ball field 10 is provided and each side has a number of differently colored, or otherwise distinguished, disks or "men" 11 and 12 to be placed and moved along on the bases as the plays are made.

Descriptions of the various plays are printed or otherwise arranged preferably adjacent to the base ball diamond as by being placed part on each side thereof as shown at 13, 13. Each of the plays is given a multiple part designation. In the illustrative form shown herewith, each play is given a two part designation, consisting of a pair of numbers as 13—13; 5—1., etc.

Means are provided for determining the play to be made by chance selection of the multiple identifying designation given to the respective plays. In the forms shown a series of numbers 14 are arranged about a disk 15 preferably placed within the diamond 16 behind the pitcher's box 17 and a plurality of concentric spindles 18—18 are pivotally mounted on the disk 15. There are as many spinners as there are parts in the multiple designations for the various plays. In the form shown, two of the spinners 18 are provided.

The spinners are preferably made in the form of base ball bats with the handle ends somewhat longer than the larger ends of the bats and serving as pointers. The indicating numbers 14, 14 are preferably arranged within the outlines of base balls, as shown at 20, Fig. 1, the seams and stitching for all but one of the balls being omitted in the drawings for the sake of clearness.

Upon turning the spinners 18, 18 and noting the numbers at which they stop, the play is determined by taking that play which is designated by the same combination of characters; for example, if both spinners stop at the number 13, the indication given is 13—13 and it is found on reference to the description of the plays that a home run has been made. If one of the spinners stops at 5 and the other at 2, the corresponding play will be found to be "foul fly—batter out," etc., a play being designated for each position at which the spinners may stop. Only a portion of the various plays is shown on the drawings for the purpose of affording an understanding of the invention but it will be apparent that a large number of combinations of characters can be formed and a correspondingly large number of plays indicated thereby, thus giving great flexibility and permitting a sufficiently large number of plays to be indicated to give a substantially correct simulation of a base ball game played in accordance with the professional standard.

Adjustable means for keeping track of the score details for each inning or half inning are provided preferably arranged also adjacent to the diamond. In the form shown same are arranged behind the catcher and may comprise arcuate indicia 19 having rotatable pointers 20—20 arranged so that they can be turned adjacent thereto, thereby indicating the number of strikes, balls, hits, outs, etc., by being turned through appropriate distances. These pointers are turned back to zero as soon as the inning, or half inning, is complete.

A chart for containing the official score is provided at 21 and entries are made thereon as each half inning is completed. Such chart 21 is preferably made up in pads so that when the top sheet has been filled out it may be pulled off, leaving a fresh surface below for the next game and the torn off sheet can be discarded or kept for reference, if desired.

Adjustable pointers 22 and 23 are mounted to be turned adjacent to the arcuate indicia 24 and 25, serving to indicate the player at the bat for the respective teams, which are preferably designated as the home team and the visiting team.

Modifications and changes may be resorted to within the scope of my claims without departing from the principle of my invention or sacrificing the advantages thereof.

I claim:

1. In a base ball game apparatus, a series of descriptions of plays each having a two part identifying designation, and a pair of concentric spinners having designations arranged adjacent thereto and corresponding to the parts of the play designations, whereby the various plays are selected by chance by the spinners being rotated and stopping opposite the said designating characters.

2. In a base ball game apparatus, a series of plays each having a two part identifying designation, a pair of concentric spinners having designations adjacent thereto corresponding to the parts of the play designations, a series of indicia containing characters for keeping record of the score details, adjustable markers arranged adjacent thereto, and a score pad on which the score may be recorded and having removable leaves.

In testimony that I claim the foregoing, I hereto set my hand, this 7th day of June, 1920.

WILLIAM H. REEVES.